United States Patent [19]

Hirschberg et al.

[11] 4,150,608

[45] Apr. 24, 1979

[54] DRIP-COFFEE MAKER

[76] Inventors: Joseph G. Hirschberg, 1046 Alfonso Ave., Coral Gables, Fla. 33148; Harry E. Rubens, 9101 E. Bay Harbor Dr., Bay Harbor Islands, Fla. 33154

[21] Appl. No.: 830,827

[22] Filed: Sep. 6, 1977

[51] Int. Cl.² ............................................. A47J 31/10
[52] U.S. Cl. ..................................... 99/306; 215/11 B; 220/366
[58] Field of Search ................. 99/306, 304, 316, 317, 99/323; 215/310, 11 B; 220/366

[56] References Cited

U.S. PATENT DOCUMENTS

| 385,880 | 7/1888 | Racer | 99/306 |
|---|---|---|---|
| 2,227,540 | 1/1941 | Fry | 99/306 |
| 2,462,349 | 2/1949 | Battilani | 99/306 |
| 2,736,446 | 2/1956 | Raiche | 215/11 B |

Primary Examiner—Robert W. Jenkins
Attorney, Agent, or Firm—Harry Ernest Rubens

[57] ABSTRACT

A drip-coffee maker having a coffee dispersing section mounted to a coffee receiving vessel, the latter characterized by having double walls provided with an evacuated space therebetween, a filter contained in the dispersing section to filter the coffee into the vessel, and a venting means positioned between the dispersing section and the vessel to provide atmospheric connection between the vessel and the atmosphere.

3 Claims, 4 Drawing Figures

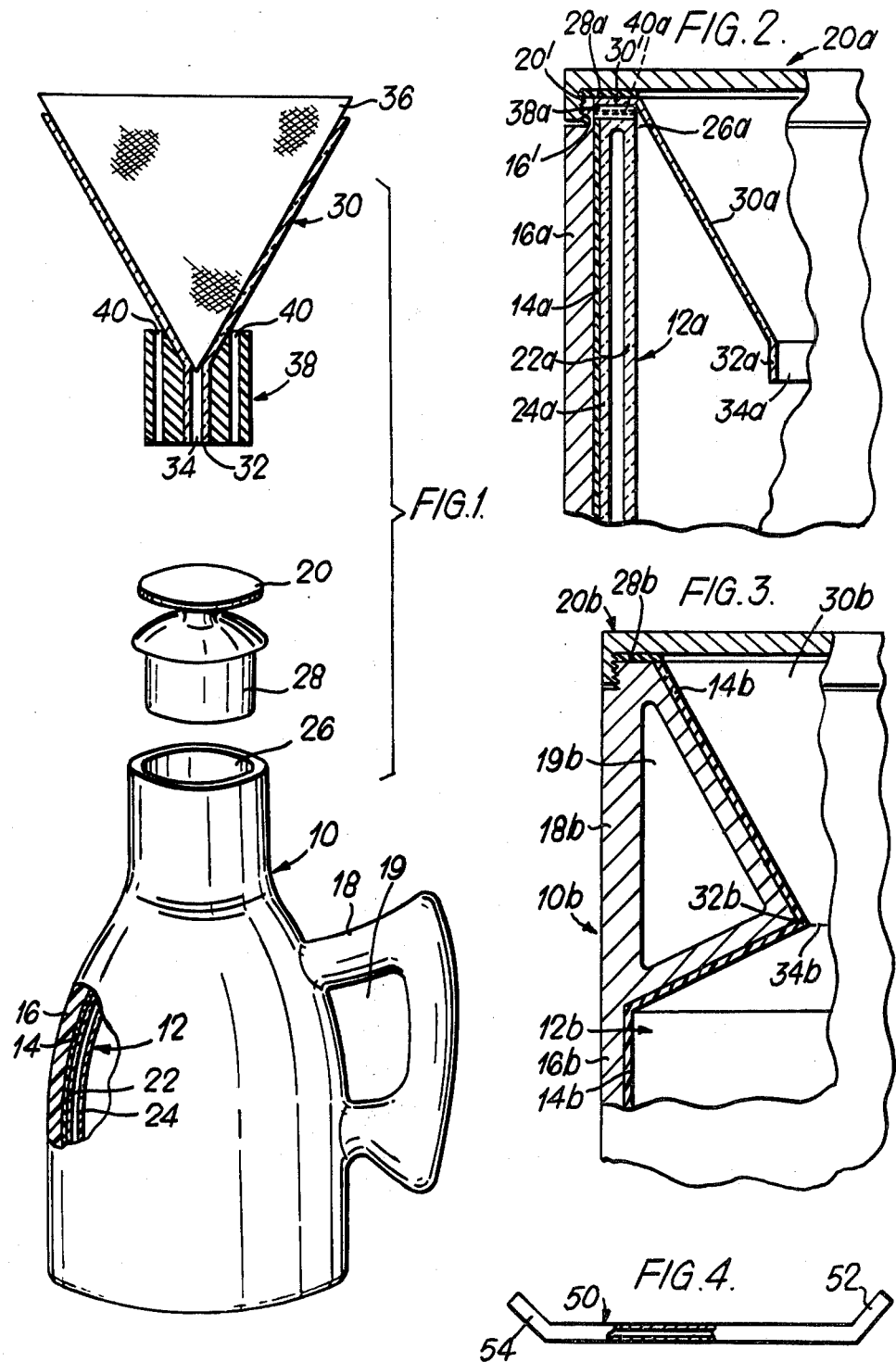

DRIP-COFFEE MAKER

Our invention relates to a filtered or drip-type coffee maker, and more particularly to a coffee maker which does not require a warming stand for continuously heating the coffee during the dripping process.

Such reheating of the prepared coffee causes a loss of the volatile flavor-forming components of the coffee bean, and is undesireable.

It is an object of our invention to provide a drip-coffee maker which does not require reheating the coffee when it is not immediately consumed after preparation, and which will remain hot for substantial periods of time.

A further object is to provide such a coffee maker which will retain the full coffee flavor of the original dripped coffee. Further objects consist in providing a coffee maker which is less expensive than convential types; easier to maintain than those now in use; and which eliminates the upright stand required for most types.

These and other objects are accomplished and our new results obtained, as will be apparent from a consideration of the following description the claims appended hereto, and the drawing in which:

FIG. 1 is an exploded view of the three elements of our coffee maker;

FIG. 2 is a fragmentary view in longitudinal cross-section of another form of the same;

FIG. 3 is a similar view of still another of our coffee makers;

FIG. 4 is a side elevation of a venting tube.

Referring more in detail to FIG. 1 of the drawing, we provide as the basic coffee receiving container 10, a double-wall inner vessel 12, preferably made of glass, and insulated as at 14, all enclosed in a housing 16 provided with a handle 18. A cap 20 may be provided to seal the contents when the coffee is not immediately used.

The space between the wall 22 and the wall 24 of the vessel 12, is evacuated. The closure cap 20 is provided with a resilient plug 28, usually made of cork, to softly but tightly seal the opening 26 in the vessel 12.

The coffee-dispersing section 30 is formed with a hollow neck 32 having an opening 34. Within the section, a filter paper 36 is positioned which holds the ground coffee, and into which the hot water is poured, dissolving the soluble elements which pass through the paper into the coffee-holding vessel 12.

Around the neck 32, a cork or rubber plug 38 is located, provided with openings 40, forming relief vents for the vessel 12. The plug 38 is about the same diameter as the closure plug 28, for insertion into the opening 26 of the vessel 12.

The procedure for making the drip-coffee is to first preheat the vessel by pouring boiling water into the vessel until the maximum residual heat is retained in the vessel before the coffee is allowed to drip therein. For maximum residual heat, the boiling water may also be poured through the coffee dispersing section to prevent a lowering of the coffee temperature. With the hot water removed, the desired amount of boiled water is then poured through the coffee grounds until all is filtered into the vessel. The dispersing section, and filter are then removed and the closure cap 20 placed into the opening 26, sealing the vessel, until it is desired to use the filtered coffee.

In FIG. 2, the double-walled vessel 12a is cylindrical in shape to provide an opening 26a large enough to house the coffee-dispersing section 30a, which may rest on the resilient washer 38a, encircling the opening 26a. The dispersing section 30a may be provided with a flange 30' to position the section on the vessel.

The closure cap 20a of FIG. 2 is threaded as at 20' to engage threads 16'. A resilient washer 28a, seals the cap to the housing.

A vent 40a consisting of radially formed grooves in the resilient washer 38a, operates to vent the air from the inner vessel. The vents are compressed to inoperability, when the closure cap is twisted to seal the contents.

FIG. 2 is illustrated with the filter paper removed and the dispersing section self-contained within the closed vessel for storage. The section is thus always available for immediate use.

In FIG. 3, we have illustrated a coffee-dispersing section 30b which is an integral part of vessel 12b for containing the drip-coffee. The vessel is of the double-walled variety as in FIG. 2, for maximum heat retention. With this configuration, the housing 16b is molded in the form shown, to form a handle 18b, with a finger opening 19b to correspond to opening 19 of FIG. 1. The cone-shaped configuration provides the finger opening in this container.

This configuration eliminates the need for supporting the coffee-dispersing section, or removing it for dispensing the coffee from the vessel.

Similar parts are correspondingly numbered throughout the views but with an added letter.

The self-contained dispersing section of FIG. 3 requires a venting type of filter paper, or a special vent such as is shown in FIG. 4. This may consist of a glass tube 50 with bent ends for support on the section 30b and for extension through the opening 34b, involving ends 52 and 54 respectively. The vent 50 may be placed under the filter paper.

The foregoing constructions permit the use of glass for most surfaces in contact with the coffee, this being highly desireable to avoid changing the coffee flavor by contact with plastic or metal.

The coffee-dispersing section should have a shape which permits gravity to pull the coffee towards the center opening. Some of the walls should therefore be tapered towards the opening to avoid any coffee being retained in the section after the dripping process.

The base of the housing containing the coffee-collecting vessel should be made sufficiently large to hold the coffee in the dispersing section without danger of upset. This will eliminate the need for a large stand which usually supports a heater, to maintain stability.

The self-venting feature may be incorporated in the filter by forming a compressed semicylindrical groove along the first fold of a double folded filter. Thus when the cross fold is made, the two semicylindrical grooves face each other forming a vent leading towards the apex, which will retain its shape due to the paper compression, for a single use of the filter paper.

The invention thus described and illustrated is not confined to the particular forms shown and described, the same being only illustrative. The invention may be carried out in other ways, coming within the scope of the appended claims by means of which objects of our invention are attained and the new results achieved.

We claim the following:

1. A drip-coffee maker for coffee storage comprising a coffee-dispersing section mounted to a coffee-containing vessel having only a single opening thereto, said vessel having double walls and evacuated space therebetween, said dispersing section adapted to receive a filter for filtering the coffee into the vessel, said dispersing section further provided with an open connection through the opening of the vessel to the atmosphere during the filtering process, and a tightly fitted closure cap provided with a resilient washer, for completely closing and sealing the opening to the vessel.

2. The drip-coffee maker of claim 1, wherein the coffee-dispersing section and the coffee-containing vessel are made in one piece.

3. The drip-coffee maker of claim 1, in which the coffee-dispersing section is loosely seated on the coffee-containing vessel, with the closure cap locking the coffee-dispersing section tightly to the coffee-containing vessel, thereby securing the coffee-dispersing section against movement when the drip-coffee maker is sealed.

* * * * *